March 18, 1969 G. G. WARD 3,433,118
COUPLING PIN PROTECTOR
Filed Aug. 11, 1967
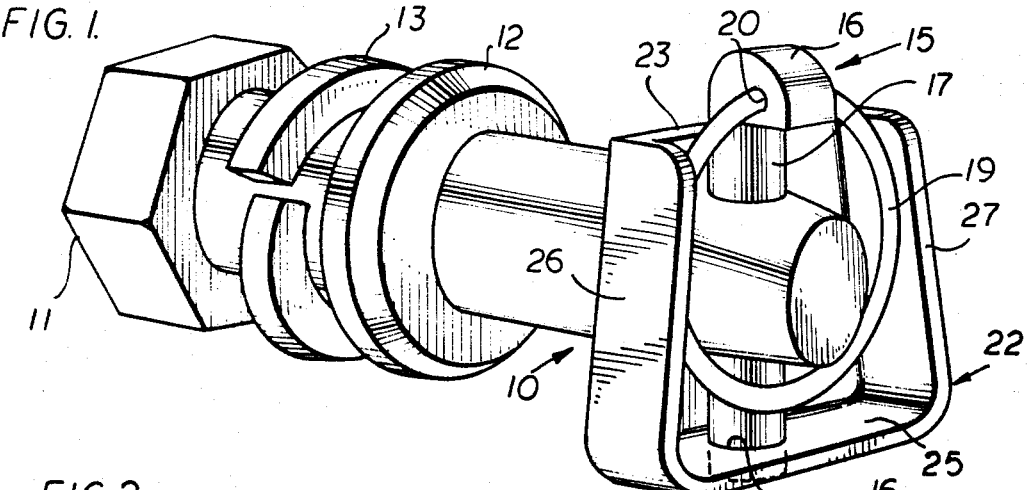
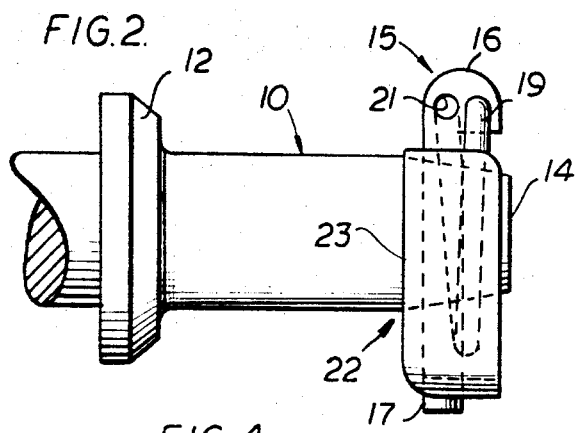
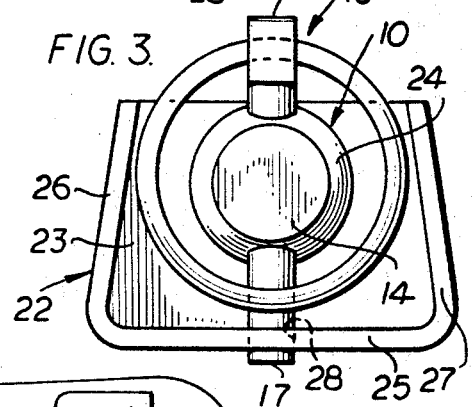
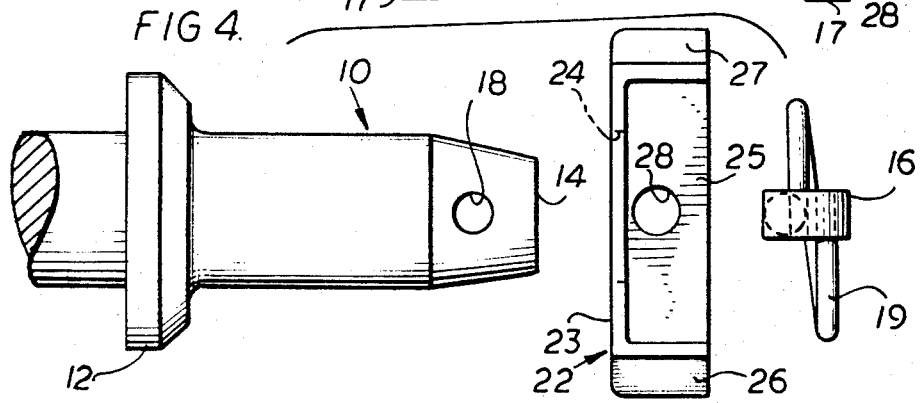
INVENTOR
GERALD G. WARD
ATTY United States Patent Office 3,433,118
Patented Mar. 18, 1969

3,433,118
COUPLING PIN PROTECTOR
Gerald G. Ward, Naperville, Ill., assignor to International Harvester Company, Chicago, Ill., a corporation of Delaware
Filed Aug. 11, 1967, Ser. No. 659,913
U.S. Cl. 85—8.3                                  1 Claim
Int. Cl. F16b 21/18

ABSTRACT OF THE DISCLOSURE

An implement is connected to a tractor having hitch links by pivotally connecting each link to a shaft carried by the implement. A vertical opening in the outer end of the shaft receives a pin having a resilient ring pivoted in its head large enough to be swung downwardly over and under the outer end of the shaft to prevent dislodgement of the pin. A generally rectangularly shaped protective shroud having two open sides and designed to prevent trash and dirt build-up from below dislodging the ring and pin has an opening in one side to receive the shaft interiorly of the pin, side walls and a horizontal base extending outwardly beyond the pin and ring parallel to the shaft and having means to prevent axial displacement of the shroud on the shaft.

---

This invention relates to quick release couplers and particularly to a coupler for connecting implements such as agricultural devices to tractors.

In connecting an implement such as a plow to the hitch mechanism of a tractor where a shaft carried by the implement, for example, has means thereon for pivotal connection to a draft link carried by the tractor, it is customary to provide a quickly releasable pin at the outer end of the shaft to avoid separation of the parts and the consequent danger of separation of the implement during operation as well as damage to the hitch elements.

The pin is inserted in an aperture through the shaft, and insertion and removal of the pin are facilitated by the provision of a ring pivoted in the head of the pin and adapted to be swung down over and under the outer end of the shaft. Such a ring is often split in the form of a coil having a spring bias inhibiting its being dislocated and the pin forced out of its opening in the shaft. However, under the severe operating conditions to which agricultural implements are subjected, soil and weeds disturbed by the implement and pressing vertically upwardly against the hitch structure force the ring out of its locking relation to the shaft and allow the coupling pin to be also pushed out or become unseated by the bouncing of the tractor and implement over rough ground.

Therefore, this invention contemplates means for protecting such a quick release coupling for an implement and has for its object the provision of a protecting cover or shroud particularly adapted to prevent penetration of the coupling mechanism by dirt, trash and the like and the consequent unseating of the pin.

Another object of the invention is the provision of novel safety coupling means for connecting an implement to a tractor or the like wherein the releasable coupling pin is shielded from accidental dislodgement by outside forces, particularly dirt and trash engaging the coupling mechanism during operation of the implement, and without sacrificing the ease and speed by which the coupling can be applied or removed to effect quick connection of the implement to or disconnection from the tractor or the like.

Further objects and advantages of the invention will become clear from the following detailed description when read in conjunction with the accompanying drawings, wherein:

FIGURE 1 is a perspective view of the coupling pin and protective shroud of this invention as applied to a portion of an attaching mechanism of the type used in the connection of an agricultural implement to the draft links of a tractor hitch structure;

FIGURE 2 is a side elevation on a smaller scale of a portion of the structure shown in FIGURE 1;

FIGURE 3 is an end view of the structure shown in FIGURE 2; and

FIGURE 4 is an exploded plan view of the structure shown in FIGURES 2 and 3.

Although FIGURE 1 shows only the intermediate assembly by which an agricultural implement or other device may be connected to a tractor hitch structure or other device, it may be understood that a stub shaft 10 is threaded at its inner end to receive a fastening nut 11, and that a collar 12 is affixed to the shaft intermediate its ends. An implement part, not shown, is adapted to be mounted on the shaft between collar 12 and a washer 13 abutting nut 11. A tractor hitch part, such as one of the lower links of a tractor three-point hitch, not shown, is adapted to be pivotally connected to the shaft between collar 12 and the tapered end 14 of the shaft.

The parts are held in their assembled relation against axial displacement from the shaft by the provision of a vertically extending coupling pin 15 having an enlarged head 16 and a shank 17 slidably receivable in a radial opening 18 in the tapered end of the shaft.

The pin is locked against displacement from the opening in the shaft by the provision of a spring steel coil or split ring 19 having its offset ends pivotally received in openings 20 and 21 in head 16 of the pin. Ring 19 provides a convenient handle for an operator in inserting and removing the pin from the opening 18 in the shaft and, when the pin is seated in the opening 18, the ring 19 is swingable downwardly over the outer end 14 of the shaft and has a bias inwardly against the portion of the pin projecting below the shaft.

As noted hereinbefore, in the operation of an agricultural implement such as a plow, for example, such a pin and locking ring arrangement is inadequate since the ring is frequently forced outwardly over the end of the shaft by earth and trash and the pin unseated from its opening 18. To overcome this disadvantage a protector or shroud in the form of a four-sided generally rectangularly shaped housing 22 is provided having the upper and outer facing walls removed so that an outwardly opening shroud is provided for ready access by the operator to the ring and pin.

Housing 22 comprises a vertical inner wall 23 having an opening 24 therein substantially equal to the diameter of the cylindrical portion of shaft 10, an outwardly extending horizontal lower wall or base 25, and generally vertical side walls 26 and 27 converging somewhat upwardly, said lower and side walls projecting outwardly beyond pin 15 and ring 19 when the pin and the ring are in locked position.

The base 25 of protector 22 is provided with an opening 28 therein in vertical alignment with opening 18 in the shaft to receive and seat the lower end of stem 17 and to prevent axial displacement of the protective shroud 22 relative to shaft 10.

Due to the fact that the top and outer side of the protective shroud are open, an operator has easy access to it for insertion and removal of the coupling pin. The horizontal lower side 25 and upwardly extending walls 26 and 27 prevent trash from funneling over the base 25 and into the housing behind ring 19 to force it outwardly over the end of the shaft leaving the coupling pin unprotected from forces tending to unseat it.

It is believed that the construction and operation of the novel coupling pin protecting mechanism of this invention will be clearly understood from the foregoing description. It should likewise be understod that the invention has been described in its preferred embodiment and that modifications may be made therein without departing from the spirit of the invention.

What is claimed is:

1. In combination with a removable coupling pin in a shaft element having a radial opening at its outer end to receive the pin and having a connection with another element to retain said elements in assembled relation; a protector for the pin comprising a generally rectangularly shaped housing open at the top and to the outside having an inner wall normal to the axis of and apertured to receive the shaft element interiorly of the pin, a horizontal base parallel to the axis of the shaft element extending outwardly beyond the pin and generally vertical side walls extending outwardly substantially coextensive with the base, means cooperative between the housing and the pin to prevent displacement of the housing axially of the shaft, said housing base having an opening therein to receive the lower end of the pin and prevent shifting of the housing axially of the shaft element, and a ring having a diameter less than the interior dimensions of said housing and less than the length of said pin pivotally mounted in the upper end of said pin and swingable downwardly over the outer end of the shaft element and inwardly of the outer edge of said housing base, said ring being made of resilient material and split to provide axially spaced ends, the upper end of the pin having openings therein to receive said ring ends to provide an inward bias when the ring is swung downwardly over the outer end of the shaft element.

References Cited

UNITED STATES PATENTS

| 897,444 | 9/1908 | Ballif | 85—7 |
| 2,097,320 | 10/1937 | Fox | 85—8.1 |
| 2,345,141 | 3/1944 | McMullen | 85—8.1 |
| 2,674,169 | 4/1954 | Sawyer. | |

EDWARD C. ALLEN, *Primary Examiner.*

U.S. Cl. X.R.

85—8.9